Aug. 18, 1970  B. ZAUDERER  3,525,000
ELECTRODE CONFIGURATION IN A LINEAR MHD GENERATOR
Filed Oct. 24, 1967
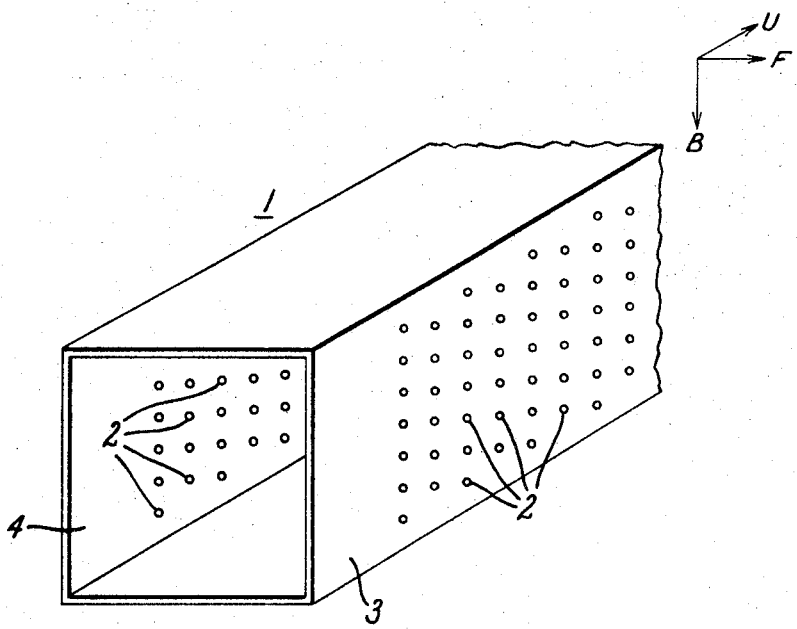
INVENTER:
BERT ZAUDERER
BY
AGENT

United States Patent Office 3,525,000
Patented Aug. 18, 1970

3,525,000
ELECTRODE CONFIGURATION IN A LINEAR MHD GENERATOR
Bert Zauderer, Bala Cynwyd, Pa., assignor to General Electric Company, a corporation of New York
Filed Oct. 24, 1967, Ser. No. 677,621
Int. Cl. H02n 4/02
U.S. Cl. 310—11                5 Claims

ABSTRACT OF THE DISCLOSURE

Relatively efficient generation of electrical power in a non-equilibrium MHD generator is attained by an electrode configuration comprising flush mounted, axially and transversely segmented electrodes.

INTRODUCTION

This invention relates to the generation of electricity in a device including a linear magnetohydrodynamic (hereinafter MHD) channel, and more particularly to an electrode configuration rendering such a device more efficient.

BACKGROUND OF THE INVENTION

Movement of an electrically conductive material through a transverse magnetic field and specifically the interaction of the moving conductor with the magnetic field results in the establishment of electrical voltage potentials in the conductive material. A device based on this principle, in which a conductive fluid comprises the moving electrically conductive material, is generally referred to as a MHD generator. Descriptions of MHD generators may be seen in U.S. Pats. 1,717,413—Rudenberg, 3,183,380—Hurwitz, Jr., et al. and 3,149,247—Cobine et al.

The gases used in the prior art devices have generally been rendered conductive by thermal ionization at relatively high temperatures. This represents an equilibrium condition for these gases at these temperatures and such MHD generator systems may therefore be considered as equilibrium systems. Gases at lower temperatures may be rendered conductive by applying an electric field, either externally or by means of the Faraday electromagnetic induction effect, to raise the electron temperature of the gas. This induces non-equilibrium ionization and systems based on gases rendered conductive in this way are non-equilibrium systems. The importance of developing non-equilibrium MHD generators is based on two factors: first, the lower operating temperatures of non-equilibrium MHD generators as compared to the more typical equilibrium systems; and second their potential utility as supplementary generators in conjunction with and complements of Brayton or Rankine cycle nuclear electrical power generator systems. However, non-equilibrium MHD generators for reasons discussed more fully below, have not heretofore been practical.

One common type of MHD generator is that in which conductive gas is passed at high speed through a longitudinal or linear channel having a generally rectangular cross-sectional area. This type of generator, referred to herein as a linear MHD generator, also requires a means for producing a magnetic field transverse to the axis of the linear channel. If the magnitude of (a) the conductivity of the moving gas, (b) the velocity of the moving gas, and (c) the strength of the transverse magnetic field, is sufficiently great two distinct and measurable voltage potentials are established. The first of these, known as the Faraday field, is transverse both to the magnetic field and to the channel axis or conductive gas flow direction. The second of these, known as the Hall potential, is transverse to the magnetic field but is in the axial direction, i.e. in the direction of flow of the conductive gas. Power can be extracted from a MHD generator in both the Hall and Faraday mode. In the Faraday mode the power is extracted by placing transverse load impedances along the MHD channel. In the Hall mode of operation, these transverse load impedances are short circuited and the power is extracted by means of axial load impedances.

The quantity $\beta_e$, which is the ratio of the electron cyclotron frequency to the electron-atomic particle collision frequency in the moving conductive gas, is an inherent characteristic of the generator. It is also proportional directly to the magnitude of the magnetic field strength and the electrical conductivity of the gas and inversely to the electron density. The latter two plasma properties are proportional to the electron temperature of the flowing gas.

For several reasons it would be desirable to operate MHD generators with a high value of $\beta_e$. These include the fact that higher power levels are obtainable with stronger magnetic fields, and higher electrical conductivities. A second reason is the inherently high $\beta_e$ of MHD generators using inert gases. These gases are preferred working gases, however, because they can be used as the coolant in high temperature nuclear reactors and because they are more easily rendered conductive due to their small elastic electron-atom collision cross-section. This inherently high $\beta_e$ value, substantially greater than unity, is also attributable to the small elastic electron-atom collision cross section of inert gas.

In perfectly efficient MHD generator, the ratio of the Hall potential to the Faraday potential would equal $\beta_e$. Actually of course this ratio is always less than $\beta_e$ Faraday mode, inert gas, non-equilibrium MHD generators necessarily operate with a high Faraday potential and high $\beta_e$. Therefore high efficiency in such generators requires the maintenance also of a high Hall potential.

Electron heating, non-equilibrium ionization and non-equilibrium MHD generators have been discussed by Hurwitz, Jr., Sutton and Tamor in the ARS Journal, August 1962, pages 1237–1243. They indicated that high $\beta_e$ and probably inert gas working fluids would be necessary in such systems. Further they indicated that instabilities and non-uniformities would interfere with electron heating and short out the Hall potential. With regard particularly to Faraday mode operation, axial segmentation of electrodes, i.e. the distribution of electrically insulated electrode segments along the fluid flow path of the conductive gas in a linear MHD generator, was indicated by Hurwitz, Jr., et al. to be essential in order to prevent the short circuiting of the Hall potential.

Among the problems of high $\beta_e$ MHD generators with axially segmented electrodes is that of localized concentration of current flow on portions, usually edges, of the electrode segments. This has been discussed, along with the theoretical voltage potentials throughout such systems, by Hurwitz, Jr. and Kilb in the Journal of Applied Physics, vol. 32, No. 2, February 1961, pages 205–216.

Despite this apparent recognition of some of the problems involved, reasonable efficiency has not been attained in any non-equilibrium MHD generator prior to the present invention.

It is therefore an object of the present invention to provide a on-equilibrium MHD generator having improved power extraction efficiency.

Another object of this invention is to facilitate the extraction of practical amount of electrical energy from a non-equilibrium MHD generator.

Still another object of the present invention is to provide an electrode structure for a linear non-equilibrium MHD generator which minimizes inadvertent dissipation of electrical energy.

A further object of this invention is to provide a more efficient electrode configuration for a non-equilibrium MHD generator.

One other object of this invention is to provide a practical means for generating electrical power at lower temperature in a MHD system.

BRIEF SUMMARY OF THE INVENTION

These and other objects are met, in accordance with the present invention, by an electrode configuration, for a non-equilibrium, linear MHD generator, comprising flush-mounted, axially and transversely segmented electrodes on the inner surfaces of opposed walls of the MHD gas flow channel. Preferably, axially adjacent electrode segments are offset from one another in the transverse or magnetic field direction.

DETAILED DESCRIPTION OF THE INVENTION

While the specification concludes with claims particularly pointing out and distinctly claiming the subject matter of the present invention, this invention may be better understood from the following description, taken in conjunction with the drawing, which is an isometric view of a portion of a linear MHD generator channel in which is incorporated the electrode configuration of the present invention.

Referring more specifically to the details of the drawing there is shown a linear MHD channel 1 having a square cross section. A plurality of electrode segments 2, distributed both axially and transversely of the fluid flow path, are disposed on opposed side walls 3 and 4 of channel 1. Transverse segmentation of the electrodes is important to prevent concentration of the Faraday field and the current ow on localized portions of the electrodes. Electrode segments 2 are insulated from one another to prevent the passage of axial or Hall current therebetween, and are mounted flush with the inner surface of the opposed channel walls 3 and 4. Although the flush mounting results in slightly greater electrode losses, it reduces non-uniformities due to gas dynamic effects in the flowing fluid and it results together with the two way segmentation of electrodes in the maintenance of a steady high Hall potential indicating a minimum of internal dissipation of electric energy through the flowing of axial current in the device. This enhances the efficiency of electrical power extraction from opposed electrode segments on channel walls 3 and 4. Internal shorting of the Hall potential by arcing between axially adjacent electrode segments which can be caused by the effect of convective blowing on the discharge is prevented by traversely offsetting, in the magnetic field direction, axially adjacent electrode segments. The offsetting of axially adjacent electrodes enables one to reduce the axial distance between successive electrode segments, which further improves the efficiency of the device.

With reference to the normal operation of the linear MHD channel shown in the drawing, an inert gas or alkali metal-seeded inert gas with an electron density of about $10^{11}$ electrons per cubic centimeter due to thermal ionization, external pre-ionization or a combination thereof is passed at high velocity, indicated by the vector U in the drawing, through channel 1. A magnetic field, indicated as B in the drawing, is imposed, by coil not shown, transverse to the channel and to the interelectrode region between walls 3 and 4. Due to the Faraday electromagentic inductive effect, it establishes an electrical potential between walls 3 and 4 and causes non-equilibrium ionization of the inert gas in channel 1. The interaction of the moving ionized gas with the magnetic field results in the establishment of Faraday and Hall potentials in the gas flowing through channel 1. Electrical energy is extracted by electrode segments utilizing the Faraday potential thus established. For this purpose each electrode segment on wall 3 is connected by an electrical circuit external to the channel 1 to an opposed segment 2 on wall 4. When power is generated, a current flows through this circuit between paired, opposed electrode segments. In order to optimize the power generation throughout the cross section of the channel, rheostats in each of the external circuits between opposed electrodes segments are adjusted so that during operation of the generator a uniform current flows through each of the various pairs of opposed electrode segments.

Because of the electrode configuration of the present invention a relatively high Hall potential is maintained in the generator and is not dissipated. Internally the local current concentration on the edge of the electrodes normally associated with high $\beta_e$ systems is sharply reduced by the transverse segmentation of electrodes while the transverse offsetting of axially adjacent electrode segments helps to maintain the high Hall potential by avoiding arcing along the channel walls. Finally the transverse segmentation and flush mounting of the electrodes optimizes interaction across the cross section of the channel and minimizes localized dissipation of energy through eddy currents, turbulence and other gas dynamic effects.

Experiments demonstrating the feasibility of the present invention have been conducted in a 5 centimeter square linear MHD channel with flush mounted, axially, and transversely segmented electrodes. The axial and transverse distance between the centers of adjacent electrode segments was about 0.4 inch. The electrode segments comprised ⅛ inch disks. A capacitor controlled coil was used to apply a magnetic field of up to 30,000 gauss across the channel. Neon, helium, argon and xenon with and without cesium seeding have been used in these experiments. Gas temperatures have ranged from 2800° to 8000° K. and gas velocities from 800 to 1700 meters per second with local Mach numbers of about 1 to 1.6. The Hall parameter was varied in these experiments from less than 1 to 30 and the Hall voltage was found to be at a level in agreement with uniform plasma MHD generator theory. By comparison, axially segmented protruding electrodes under the same conditions were found to result in a Hall potential generally on the order of one-half of that obtained with the flush- electrodes. In view of these results, the importance of the novel electrode configuration taught herein is apparent.

In one example of these experiments, a gas mixture of 98% neon, 2% xenon, at a temperature of 2800° K. was passed through the channel at 1600 meters per second, producing a local Mach number of 1.3. By the application of an external D-C field the electron density of the gas entering the channel was raised from $10^8$ to $10^{11}$ electrons per cubic centimeter. Under the influence of the magnetic field, the electron density in the channel was then raised to $10^{15}$ electrons per cubic centimeter. In this experiment a power level on the order of tens of kilowatts was attained at energy conversion efficiency of about 4%. This is significantly better efficiency than has heretofore been achieved in any MHD generator operating in the non-equilibrium mode.

While the present invention has been described with reference to particular embodiments and operating conditions for purposes of clarity and convenience, it should be understood that numerous modifications may be made by those skilled in the art without departing from the invention's true spirit and scope. Therefore the appended claims are intended to cover all such equivalent variation as come within the true spirit of the present invention.

What I claim as new and desire to secure by Letters Patent of the United States is:

1. In a non-equilibrium MHD generator comprising a longitudinal duct, means for passing a high velocity stream of gas axially through said duct, means for producing in said duct a magnetic field transverse to the axis of said duct and means for extracting current from an electrical field transverse both to said duct axis and to said magnetic field direction, the improvement consisting of an improved electrode structure for said current extraction means, said structure comprising flush-mounted electrodes on opposed walls of said duct, said electrodes being segmented in both the axial and magnetic field directions and spaced from one another to prevent arcing along the duct walls.

2. An improved non-equilibrium MHD generator, as recited in claim 1, wherein axially adjacent electrode segments are offset from one another in the magnetic field direction.

3. An improved non-equilibrium MHD generator, as recited in claim 1, wherein said stream is an inert gas rendered conductive by the application of a magnetically induced electric field thereto.

4. An improved non-equilibrium MHD generator, as recited in claim 1, wherein said gas consists of helium, neon, argon, xenon, or a mixture thereof.

5. An improved MHD generator, as recited in claim 4, wherein said gas also includes a small amount of alkali metal vapor.

References Cited
UNITED STATES PATENTS

| | | | |
|---|---|---|---|
| 3,154,702 | 10/1964 | Rosa | 310—11 |
| 3,215,871 | 11/1965 | Brill | 310—11 |

DAVID X. SLINEY, Primary Examiner